US012780515B2

(12) United States Patent
Adams

(10) Patent No.: US 12,780,515 B2
(45) Date of Patent: Nov. 3, 2026

(54) BIODEGRADABLE AND COMPOSTABLE PACKAGING MATERIAL AND PACKAGE USING SAME

(71) Applicant: Boskovich Fresh Food Group, Inc., Oxnard, CA (US)

(72) Inventor: David William Adams, Monterey, CA (US)

(73) Assignee: Boskovich Fresh Food Group, Inc., Oxnard, CA (US)

(*) Notice: Subject to any disclaimer, the term of this patent is extended or adjusted under 35 U.S.C. 154(b) by 210 days.

(21) Appl. No.: 17/209,569

(22) Filed: Mar. 23, 2021

(65) Prior Publication Data

US 2022/0315304 A1 Oct. 6, 2022

(51) Int. Cl.
*B65D 65/46* (2006.01)
*B32B 3/26* (2006.01)
(Continued)

(52) U.S. Cl.
CPC ............ *B65D 65/466* (2013.01); *B32B 3/266* (2013.01); *B32B 7/12* (2013.01); *B32B 37/12* (2013.01);
(Continued)

(58) Field of Classification Search
CPC .... B65D 65/466; B65D 65/40; B65D 25/041; B65D 81/2069; B65D 81/2076; B32B 2553/00; B32B 2307/7246; B32B 2307/7244; B32B 2307/7163; B32B 2307/412; B32B 2250/03; B32B 38/04; B32B 37/12; B32B 7/12; B32B 3/266; B32B 23/00; B32B 23/04; B32B 2307/163; B64D 81/18; A23B 7/148; A23B 7/152; A63B 7/152
See application file for complete search history.

(56) References Cited

U.S. PATENT DOCUMENTS 5,804,265 A 9/1998 Saad et al.
5,985,388 A 11/1999 Tomita et al.
(Continued)

FOREIGN PATENT DOCUMENTS

EP 3 399 101 A1 11/2018
WO WO9711009 * 3/1997
(Continued)

OTHER PUBLICATIONS

Singh, Modified atmosphere packaging of fresh produce: Current status and future needs, LWT—Food Science and Technology, 43(3):381-392, 2010 (Year: 2010).*
(Continued)

*Primary Examiner* — Michael C Miggins
(74) *Attorney, Agent, or Firm* — Crowell & Moring LLP

(57) ABSTRACT

A packaging material including a film that is biodegradable and compostable, wherein at least one aperture is formed in the film. The at least one aperture is structured and distributed such that the film controls oxygen permeability and water vapor permeability to such an extent that when the film encompasses a food product that is initially fresh the food product will remain fresh for at least one additional day when compared with the case that the film is replaced by a plastic that is not biodegradable and compostable.

55 Claims, 12 Drawing Sheets

(51) Int. Cl.

| | |
|---|---|
| ***B32B 7/12*** | (2006.01) |
| ***B32B 37/12*** | (2006.01) |
| ***B32B 38/04*** | (2006.01) |
| ***B65D 65/40*** | (2006.01) |
| ***B65D 81/18*** | (2006.01) |

(52) U.S. Cl.

CPC .............. *B32B 38/04* (2013.01); *B65D 65/40* (2013.01); *B65D 81/18* (2013.01); *B32B 2250/03* (2013.01); *B32B 2307/412* (2013.01); *B32B 2307/7163* (2013.01); *B32B 2307/7244* (2013.01); *B32B 2307/7246* (2013.01); *B32B 2439/70* (2013.01); *B32B 2553/00* (2013.01)

(56) References Cited

U.S. PATENT DOCUMENTS

| | | | | |
|---|---|---|---|---|
| 6,068,898 | A | 5/2000 | Oyama | |
| 7,951,436 | B2 | 5/2011 | Knoerzer et al. | |
| 8,105,667 | B2 | 1/2012 | Knoerzer et al. | |
| 8,747,971 | B2 | 6/2014 | Bastioli et al. | |
| 9,162,421 | B2 | 10/2015 | Mount, III et al. | |
| 9,248,947 | B2 | 2/2016 | Georgelos et al. | |
| 2005/0180664 | A1* | 8/2005 | Yamada | B65D 33/01 383/102 |
| 2006/0165958 | A1* | 7/2006 | Sankey | B65D 33/01 428/138 |
| 2010/0003457 | A1* | 1/2010 | Ettridge | C08J 7/0427 427/331 |
| 2010/0151166 | A1* | 6/2010 | Almenar | B65D 85/345 428/36.5 |
| 2011/0236664 | A1 | 9/2011 | Ortolani et al. | |
| 2012/0008885 | A1 | 1/2012 | Karatzis | |
| 2012/0187122 | A1 | 7/2012 | Glasow | |
| 2012/0222147 | A1* | 8/2012 | Dijkstra | A01H 5/12 800/278 |
| 2012/0288692 | A1 | 11/2012 | Broyles et al. | |
| 2012/0288693 | A1 | 11/2012 | Stanley et al. | |
| 2013/0224446 | A1 | 8/2013 | Fayne et al. | |
| 2014/0242235 | A1* | 8/2014 | Edagi | A23B 7/152 426/419 |
| 2015/0107613 | A1* | 4/2015 | Lewis | A24D 3/063 131/334 |
| 2017/0247155 | A1 | 8/2017 | Chaturvedi | |
| 2020/0002070 | A1* | 1/2020 | Chaturvedi | B65D 85/34 |
| 2022/0306369 | A1* | 9/2022 | Groeneweg | B65B 61/02 |
| 2023/0109321 | A1* | 4/2023 | Della Porta | B65B 25/067 206/213.1 |

FOREIGN PATENT DOCUMENTS

| | | | |
|---|---|---|---|
| WO | WO 2015/042641 | A1 | 4/2015 |
| WO | WO-2017056081 | A1 * | 4/2017 |

OTHER PUBLICATIONS

English machine translation of JP10100353 (Year: 1998).*

Cabbage Shipping Point and Market Instructions, published by the USDA, May 2002, pp. 1-22.

United States Standards for Grades of Lettuce Published by the USDA, Effective Dec. 1, 1975 and Reprinted Jan. 1997, pp. 1-12.

Spinach Plants, Spinach Leaves, and Bunched Spinach Shipping Point and Market Inspection Instructions, Published by the USDA, Apr. 2006, pp. 1-45.

Office Action dated Sep. 12, 2025 (5 pages) out of corresponding Mexican Patent Application MX/a/2021/010214 (Foreign text).

Hunter, P.J., Atkinson, L.D., Vickers, L. et al., "*Oxidative discolouration in whole-head and cut lettuce: biochemical and environmental influences on a complex phenotype and potential breeding strategies to improve shelf-life*", Euphytica 213:180 (2017), 16 pages https://doi.org/10.1007/510681-017-1964-7.

News Release, Nippon Gohsei (Japan), Research Towards the First 100% Biodegradable Multilayer and Barrier Packaging, 2 pages, Sep. 17, 2020.

Jinwu Wang, Douglas J. Gardner, Nicole M. Stark, Douglas W. Bousfield, Mehdi Tajvidi, and Zhiyong Cai, "*Moisture and Oxygen Barrier Properties of Cellulose Nanomaterial Based Films*", ACS Sustainable Chemistry & Engineering, 2018, 6 (1), pp. 49-70 DOI: 10.1021/acssuschemeng.7b03523 (22 pages).

Yaguang Luo, Ellen R. Bomhorst, Zi Teng, Bin Zhou, Eunhee Pam, Ellen Turner, Ivan Simko, "*Discovery of Romaine Lettuce* (*Lactuca sativa var. longifolia*) *Varieties with Reduced Pinking/Browning Discoloration for Fresh-Cut-Processing*", USDA ARS Produce, Apr. 16, 2019, 3 pages https://www.perishablenews.com/produce/discovery-of-romaine-lettuce-lactuca-sativa-var-longifolia-varieties-with-reduced-pinking-browning-discoloration-for-fresh-cut-processing/.

Office Action dated Oct. 31, 2023 (five pages) out of corresponding Canadian Patent Application 3,113,809.

* cited by examiner

BIODEGRADABLE AND COMPOSTABLE PACKAGING MATERIAL AND PACKAGE USING SAME

BACKGROUND

1. Technical Field

The present invention relates to a biodegradable and compostable packaging material and a package that uses a biodegradable and compostable material.

2. Background Information

Packaging and storage of fresh produce, such as fruits, vegetables, flowers and the like fresh food items/articles, have been a challenge for years. Commonly available polymeric films, such as Polyethylene, Polypropylene, Polyesters or their laminates have been used in flexible packaging for providing functional requirements, such as transparency, strength, and seal ability. Such films also incorporate different levels of barrier to Oxygen. Controlling the Oxygen content within a package can be critical to the quality of the product displayed and the shelf life of the product. For example, if there is too much Oxygen in the package, the product can dry up and change to an undesirable pink color. If too little Oxygen is within the package, the product balloons up in size and generates an undesirable amount of $CO_2$ within the package. Thus, for this type of packaging, it is a balancing act to achieve the correct Oxygen level for a particular produce in order to slow respiration of $CO_2$ within the package by the produce, which leads to slowing the generation of moisture within the package and delays the onset of decay of the produce.

In the United States, it is common to require fresh produce to be able to last at least 14 days. Many methods have been attempted over the years in an attempt to achieve long shelf lives for produce.

One common method for packaging food articles, such as fruits, vegetables, and flowers, in order to extend their shelf life is to use modified atmosphere packaging (MAP). This technique basically involves removing the air within the package containing the food articles and replacing the air with a specific gas mixture, with gases such as $CO_2$ and $N_2$. When the specific gas mixture is achieved, the package is hermetically sealed. Such sealing causes the food articles and flowers to go to sleep (slow down their respiration), reduces moisture generation, and slows the decay of the food products. For certain food products, MAP retards discoloration of the food products, such as reducing the occurrence of pinking of lettuce. MAP allows restricted exchange of oxygen, carbon dioxide and other gases to reduce respiration of the fruits, vegetables and the flowers contained in the package. The reduced respiration results in longer shelf life of the stored food articles. Also, the reduced respiration decreases ripening, retards spread of pathogens, inhibit toughening and undesirable change in color, smell and taste of the fruits, vegetables and the flowers. The end result of using MAP is that more food articles will be sold by the retailer, since the retailer will discard less food articles for being of poor quality.

Another method for extending the shelf life of packaged food articles and flowers is to use breathable films and the use of various apertures (micro perforations). Such micro perforations have been used with plastics and polymeric films, which are known not to be biodegradable and compostable. This method relies on reducing respiration by controlling the entry of oxygen into the package and the expulsion of $CO_2$ out of the package. In addition, a gas, such as Nitrogen, may be injected into the interior of the package to further reduce respiration of the food articles and flowers. While micro perforations have been used in the past, their use has not been fine-tuned so as to improve the shelf life of particular produce being packaged. For example, past micro perforation packaging process have not appreciated that the selection of the packaging material and the choice of micro perforation parameters, such aperture sizes, patterns, and densities, can improve the shelf life of the produce.

Besides the previously mentioned methods, other methods have been attempted to reduce respiration within the package. For example, the products in the package can be subjected to a treatment, such as low temperature exposure and flash treatment of a different atmosphere, like Ozone, or with UV light. Another treatment is 1-MCP which is a fumigant that stops the absorption of ethylene (what ripens fruit and rots vegetables) to reduce the respiration of the plant and also reduces the dehydration of the plant—which in turn stops the release of moisture in a pack or a pallet.

In each of the examples given above, the packages were made of materials, such as polymeric materials, that would eventually need to be disposed of, but were not environmentally friendly for such disposal.

BRIEF SUMMARY OF THE INVENTION

One aspect of the present invention regards a packaging material including a film that is biodegradable and compostable, wherein at least one aperture is formed in the film. The at least one aperture is structured and distributed such that the film controls oxygen permeability and water vapor permeability to such an extent that when the film encompasses a food product that is initially fresh the food product will remain fresh for at least one additional day when compared with the case that the film is replaced by a plastic that is not biodegradable and compostable.

A second aspect of present invention regards a packaging material including a film that is biodegradable and compostable. The film includes a first film that controls the oxygen permeability and a second film that controls the water vapor permeability. The first film is laminated to the second film via an adhesive that is located between the first film and the second film and adheres the first film to the second film. The film controls oxygen permeability and water vapor permeability to such an extent that when the film encompasses a food product that is initially fresh the food product will remain fresh for at least one additional day when compared with the case that the film is replaced by a plastic that is not biodegradable and compostable.

A third aspect of the present invention regards a food product and a film that is biodegradable and compostable, wherein at least one aperture is formed in the film. The film defines at least part of a space in which the food product is contained. The film controls oxygen permeability and water vapor permeability to such an extent that when the food product is initially fresh and is part of the package, the food product will remain fresh for at least one additional day when compared with the case that the film is replaced by a plastic that is not biodegradable and compostable.

A fourth aspect of the present invention regards a package including a food product and a film that is biodegradable and compostable. The film includes a first film that controls the oxygen permeability and a second film that controls the water vapor permeability. The first film is laminated to the second film via an adhesive that is located between the first film and the second film and adheres the first film to the second film. The film controls oxygen permeability and water vapor permeability to such an extent that when the film encompasses the food product that is initially fresh and part of the package, the food product will remain fresh for at least one additional day when compared with the case that the film is replaced by a plastic that is not biodegradable and compostable.

A fifth aspect of the present invention regards a method of manufacturing a packaging material. The method includes applying a first film that controls oxygen permeability to a second film that controls water vapor permeability so as to define a composite film. The method further includes forming at least one aperture in the composite film to such an extent that when the composite film encompasses a food product that is initially fresh the food product will remain fresh for at least one additional day when compared with the case that the film is replaced by a plastic that is not biodegradable and compostable.

One or more aspects of the present invention provide the advantage of improved shelf life for food products packaged within biodegradable materials.

The accompanying drawings, which are incorporated herein and constitute part of this specification, and, together with the general description given above and the detailed description given below, serve to explain features of the present invention.

DETAILED DESCRIPTION OF THE PREFERRED EMBODIMENTS

Figure 1:
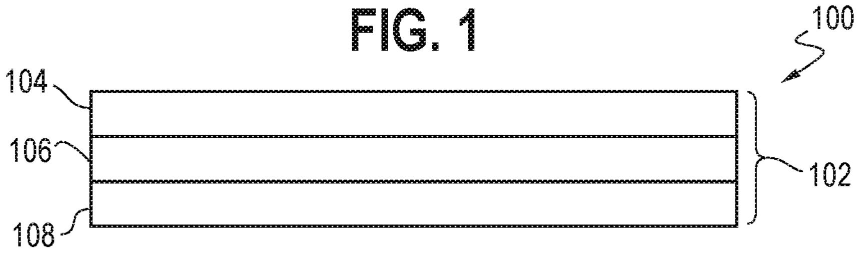
FIG. 1 schematically shows a side cross-sectional view of an embodiment of a packaging material according to the present invention.

FIG. 1 schematically show a packaging material 100 for use in manufacturing a container structure that protects an item from the environment. In particular, the packaging material 100 includes a film 102 that is transparent, biodegradable, and compostable. The film 102 has a layered structure that includes a biodegradable and compostable film 104 that is made of cellulose and controls moisture content within the package, and a biodegradable and compostable film 108 that is made of biofoil/biofilm and controls the oxygen permeability. When the film 102 is formed into a configuration that defines an interior volume of space to contain a product, film 104 faces the interior volume of space and film 108 forms an exterior surface of the configuration.

The film 104 is a sheet of cellulose that has a thickness that ranges from 19μ to 20μ. The film 104 is available commercially under the trademark NatureFlex™ and is sold by Futamura of Nakamura, Japan. The film 104 is based on renewable resources, such as wood pulp.

As shown in FIG. 1, the film 102 includes a biodegradable and compostable film 108 that is made of cellulose, is semi-permeable to moisture, and controls the water vapor permeability.

The film 104 is transparent, heat sealable and printable on both sides, and has high material strength. A summary of certain other properties of film 104 is given below:

| Properties | Testing Condition | Value 1 | Value 2 | Value 3 |
|---|---|---|---|---|
| Cellulose | | 23μ | 30μ | 45μ |
| Grammage | | 33.5 g/m$^2$ | 43 g/m$^2$ | 64 g/m$^2$ |
| Yield | | 29.9 m$^2$/kg | 23.3 m$^2$/kg | 15.5 m$^2$/kg |
| Tensile | MD | 125N/mm$^2$ | 125N/mm$^2$ | 125N/mm$^2$ |
| Strength | TD | 70N/mm$^2$ | 70N/mm$^2$ | 70N/mm$^2$ |
| Seal Strength | 135° C.; 0.5 s | 200 g/25 mm | 200 g/25 mm | 200 g/25 mm |

-continued

| Properties | Testing Condition | Value 1 | Value 2 | Value 3 |
|---|---|---|---|---|
| Water Vapor Permeability | 38° C.-90% . R.H | 600 g/m² 24 hrs | 600 g/m² 24 hrs | 600 g/m² 24 hrs |
| | 25° C.-75% R.H. | 200 g/m² 24 hrs | 200 g/m² 24 hrs | 200 g/m² 24 hrs |
| Oxygen Permeability | 23° C.-0% R.H. | 1.0 cc/m² 24 hrs | 1.0 cc/m² 24 hrs | 1.0 cc/m² 24 hrs |
| | 23° C.-50% R.H. | 5.0 cc/m² 24 hrs | 5.0 cc/m² 24 hrs | 5.0 cc/m² 24 hrs |

As shown in FIG. 1, the film 108 is a sheet that has a thickness that ranges from 19μ to 20μ. The film 108 is transparent, heat sealable and printable on both sides, and has good anti-fogging properties. The film 108 has anti-static properties, controlled slip characteristics, and is resistant to oils and greases. A summary of certain properties of film 108 is given below:

| Properties | Testing Condition | Value 1 | Value 2 | Value 3 | Value 4 |
|---|---|---|---|---|---|
| BIOFOIL | | 20μ | 30μ | 40μ | 50μ |
| Grammage | | 24.63 g/m² | 43.10 g/m² | 49.26 g/m² | 61.35 g/m² |
| Yield | | 40.6 m²/kg | 23.20 m²/kg | 20.3 m²/kg | 16.3 m²/kg |
| Tensile | MD | 20-35N/mm² | 20-35N/mm² | 20-35N/mm² | 20-35N/mm² |
| Strength | TD | 10-20N/mm² | 10-20N/mm² | 10-20N/mm² | 10-20N/mm² |
| Seal Strength | 135° C.; 0.5 s | >12 g/25 mm | >16 g/25 mm | >18 g/25 mm | >18 g/25 mm |
| Sealing range | 135° C.; 0.5 s | 80-120° C. | 80-120° C. | 80-120° C. | 80-120° C. |
| Water Vapor Permeability | 38° C.-90% R.H. | 760 g/m² 24 hrs | 640 g/m² 24 hrs | 550 g/m² 24 hrs | 475 g/m² 24 hrs |
| Oxygen Permeability | 23° C.-0% R.H. | 2060 cc/m² 24 hrs | 2060 cc/m² 24 hrs | 1065 cc/m² 24 hrs | 2060 cc/m² 24 hrs |

After the film 108 has been printed, the film 104 is laminated to film 108 via a layer of adhesive 106 that is located between the films 104 and 108 as shown in FIG. 1. Lamination can be performed in a number of different ways without departing from the spirit of the invention. For example, lamination can be performed by a laminator that includes a Nordmeccanica Combi Linear in tandem with a Nordmeccanica Super Combi 3000.

The layer of adhesive 106 is dispersed evenly between films 104 and 108 to cover both sides of the films facing the layer of adhesive 106. Such dispersion can be performed by equipment that prints a specific amount of the adhesive 106 at a specific thickness, such as ink roller. The layer of adhesive 106 adheres the film 104 to film 108. The layer of adhesive 106 has a thickness of approximately 3μ. The layer of adhesive 106 is a complex starch and is biodegradable and compostable.

Once the layer of adhesive 106 is applied to both films 104 and 108, the laminated layers are cured via storage at a specific temperature for more than 48 hours. The layer of adhesive 106 has the property that after the curing process is completed, the overall film 102 is transparent.

Figure 2A:
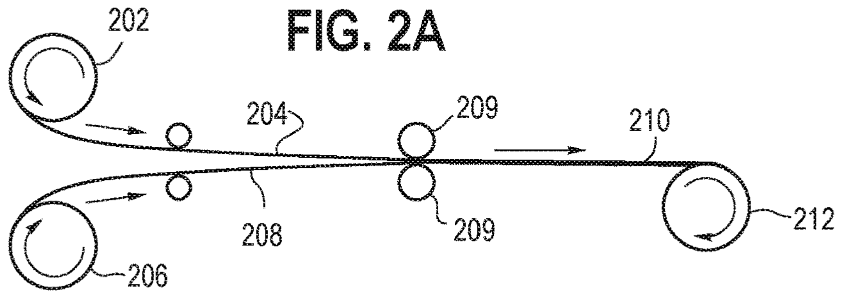
FIG. 2A schematically shows part of an embodiment of a packaging system that performs the process of forming a package that contains an item that regards forming a film of the package according to the present invention.
Figure 2B:
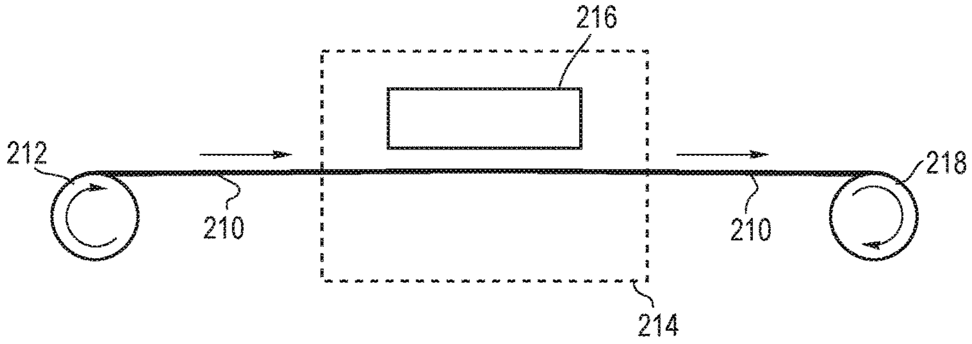
FIG. 2B schematically shows an embodiment of a packaging system that performs a second part of the process of forming a package that contains an item that regards forming perforations in the film according to the present invention.
Figure 2C:
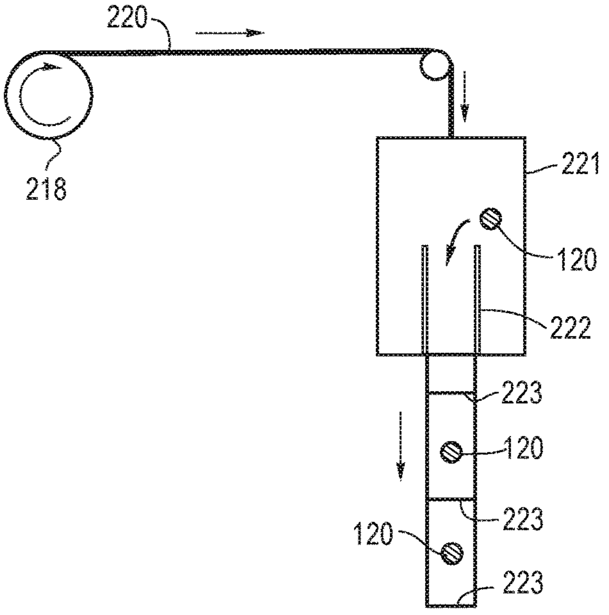
FIG. 2C schematically shows an embodiment of a packaging system that performs a third part of the process of forming a package that contains an item that regards forming a package from the perforated film per the process shown in FIG. 2B and inserting the item within the package according to the present invention.

FIGS. 2A-C schematically show one possible way to produce packages of stored items on a commercial scale. As shown in FIG. 2A, a roll 202 of a sheet 204 of film 104 and a roll 206 of a sheet 208 of film 108 are provided. The sheets 204 and 208 are fed in a well-known manner so that they face each other. Once the sheets 204 and 208 face each other, the layer of adhesive 106 is applied to the sides of the sheets 204 and 208 facing each other. The sheets 204 and 208 are pressed and laminated by rollers 209 when the adhesive 106 is applied so that a single sheet 210 of laminated film 102 is formed and which is rolled up as roll 212. Note that the process of having two rolls of sheets laminated together by an adhesive and stored as a single roll is known in general. Regarding the particular process of FIG. 2A, the process should be performed at a constant temperature that has a value that ranges from 36° F. to 65° F.

As mentioned previously, the roll 212 of film 102 formed per the process described previously with respect to FIG. 2A is cured for over 48 hours at a constant temperature that ranges from 36° F. to 65° F. After the roll 212 of film 102 is cured, it is then taken to a perforation station 214 as schematically shown in FIG. 2B. At the perforation station 214, the sheet 210 of the roll 212 is fed past a laser perforation apparatus 216 at which micro perforations are formed in the sheet 210. Prior to the sheet 210 being processed by the laser perforation apparatus 216, the operator of apparatus 216 inputs desired parameters of the micro perforations to be formed. Such parameters include the size of the micro perforations, the density/spacing of the micro perforations, and the pattern of the micro perforations. As will be discussed later, the parameters chosen depend on the item(s) being packaged as well as the amount of the item(s) being packaged. The laser perforation apparatus 216 used in the process can be the laser perforator known by the tradename of Preco 4-HSP200/2.

After the micro perforations are formed in the sheet 210, the perforated sheet 210 is stored on a roll 218. The formation of the micro perforations is preferably performed at the temperature that ranges from 36° F. to 65° F. After the micro perforations are formed and stored on the roll 218, the roll 218 is stored at a temperature ranging from 36° F. to 65° F. for a period of time that ranges from 48 hours to 2 weeks.

Once roll 218 is cured, it can be used for the packaging of items, such as food products. As shown schematically in FIG. 2C, the sheet 220 of roll 218 can be formed in the form of a continuous tube 222 by a well-known bag forming apparatus 221 that has seals 223 formed perpendicular to the length of the tube 222, wherein the food products associated with the micro perforations present are inserted into the tube and sealed up in a well-known manner. The formed packages are then separated and prepared for shipping to various locations.

While the embodiment of the film 102 described above with respect to FIGS. 1 and 2A-D regards forming perforation(s) that extend completely through films 104, 106, and 108 to control respiration through the film 102, it is envisioned that other variations to control respiration are possible. For example, it is envisioned that the perforations are formed in only one of the films, such as film 104. Such perforations would extend through the complete thickness of the one layer. In another variation, fine tuning of the respiration accomplished by perforation(s) extending completely through all or just one of the films 104, 106, and 108 can be accomplished by applying an adhesive label over one or more of such perforation(s) on the exposed surfaces of films 108 and 104. The label could be placed on the surface of film 104 facing the interior of the package or the label could be placed on the exterior surface of film 108 facing away from the interior. By varying the thickness of the adhesive portion of the label, respiration can be fine-tuned. Increasing the thickness of the adhesive would decrease respiration and decreasing the thickness would increase respiration. Selecting a particular thickness for the label's adhesive can accomplish a particular respiration. Note that the above-mentioned perforations and labels can be used with the embodiments shown in FIGS. 3A-6F. Also, combinations of perforations that extend fully through the film 102 and perforations that extend partially through the same film 102 with or without a label is possible.

Figure 5A:
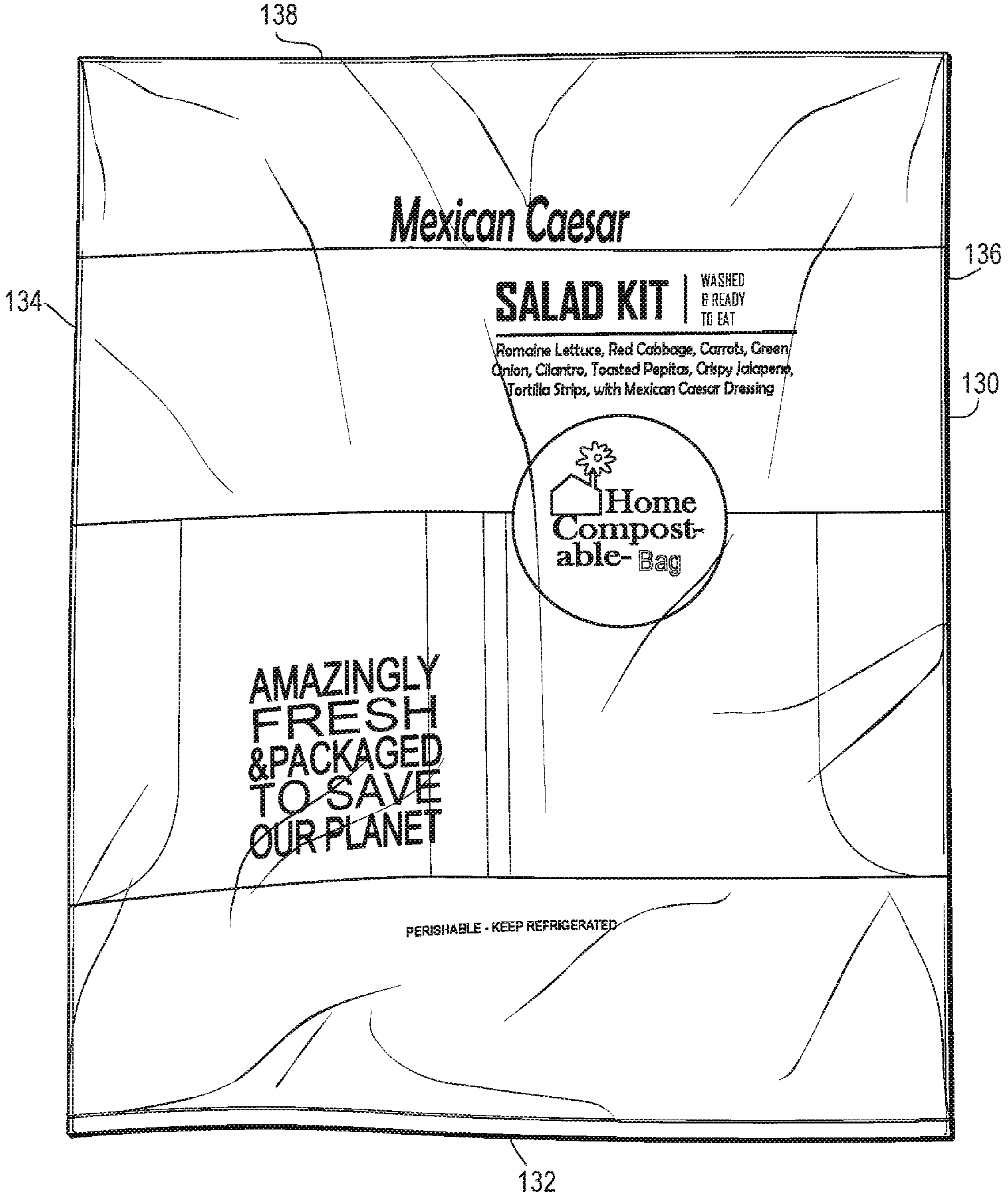
FIG. 5A shows a front view of a first embodiment of a configuration of the packaging material of FIG. 1 according to the present invention.
Figure 5B:
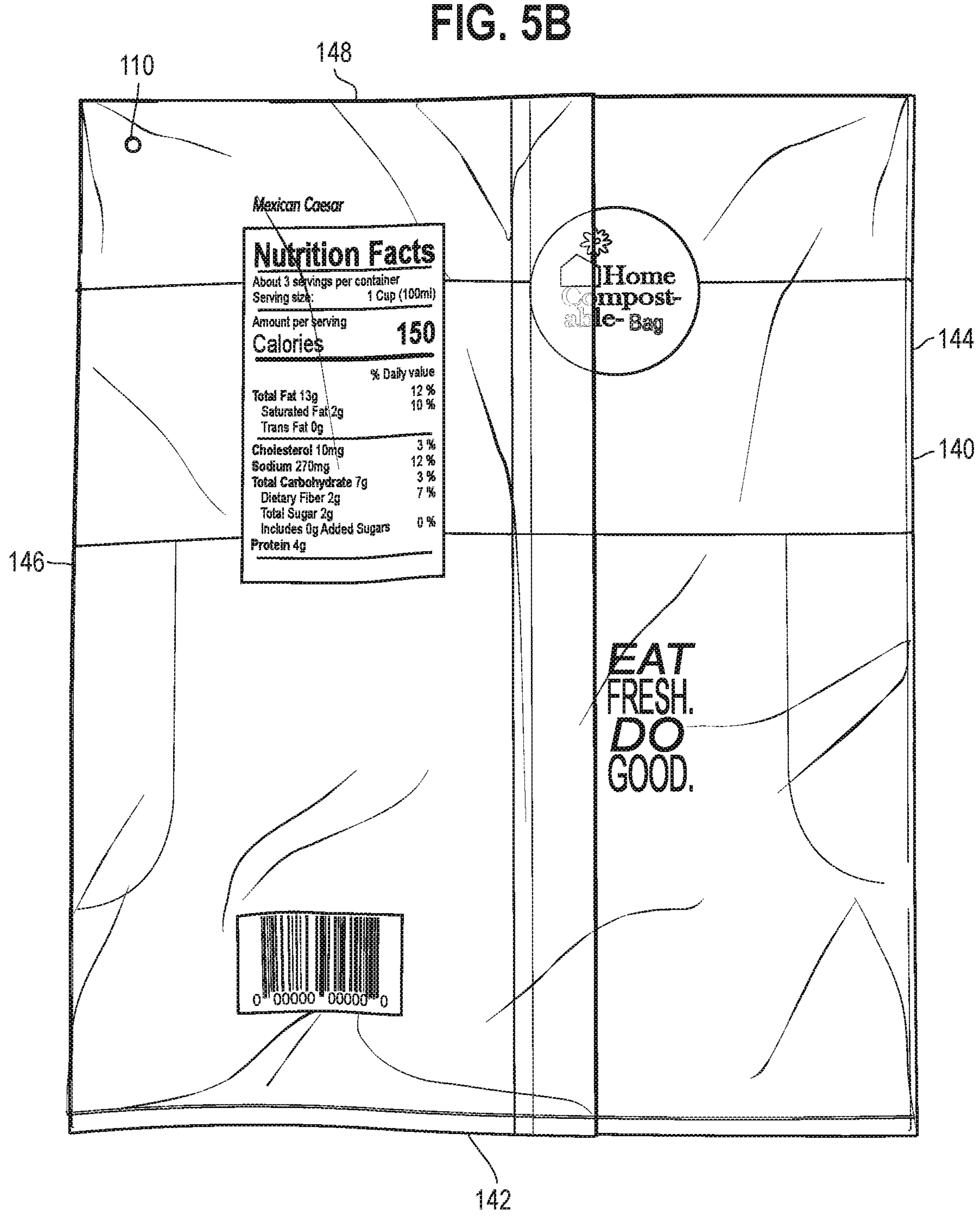
FIG. 5B shows a rear view of the configuration of FIG. 5A.

An individual configuration of the film 102 formed into a container 115 by this process is shown in FIGS. 5A-5B. In essence, the configuration is in the form of a resealable bag. When the configuration does not contain a food product, it is rectangular in shape having a front, rectangular surface 130. As shown in FIG. 5A, the front surface 130 has a bottom edge 132, a left side edge 134, a right side edge 136, and a top edge 138. The dimensions of the edges can have a variety of values depending on the quantity of food product to be contained within the bag. Possible dimensions for edges 132, 134, 136, and 138 are 9 inches, 11¼ inches, 11¼ inches, and 9 inches, respectively. The edges 132, 134, and 136 are integral with a bottom edge 142, a right side edge 144, and a left side edge 146, respectively, of a rear, rectangular surface 140 of the container 115, which are shown in FIG. 5B. The rear surface 140 has the same dimensions as the front surface 130.

The top edge 148 of the rear surface 140 is integrally attached to the top edge 138 of the front surface 130. The top edge 148 and top edge 138 define an opening for the configuration. In particular, a tear away portion is defined by the edges 138 and 148 that can be torn off entirely going from the left edge to the right edge of the package. Once the tear away portion is removed, it reveals an opening defined by the edges 138 and 148. In another embodiment, it is envisioned that the edges 138 and 148 are removably attached to one another. Such removable attachment can have various forms, such as 1) an adhesive attachment between the edges 138, 148, and a 2) a male/female attachment between the edges 138 and 148, such as the attachment used for the bag sold under the Ziploc trademark. In the case of the removable attachment between edges 138 and 148, the removable attachment is preferably biodegradable and compostable.

Figure 5C:
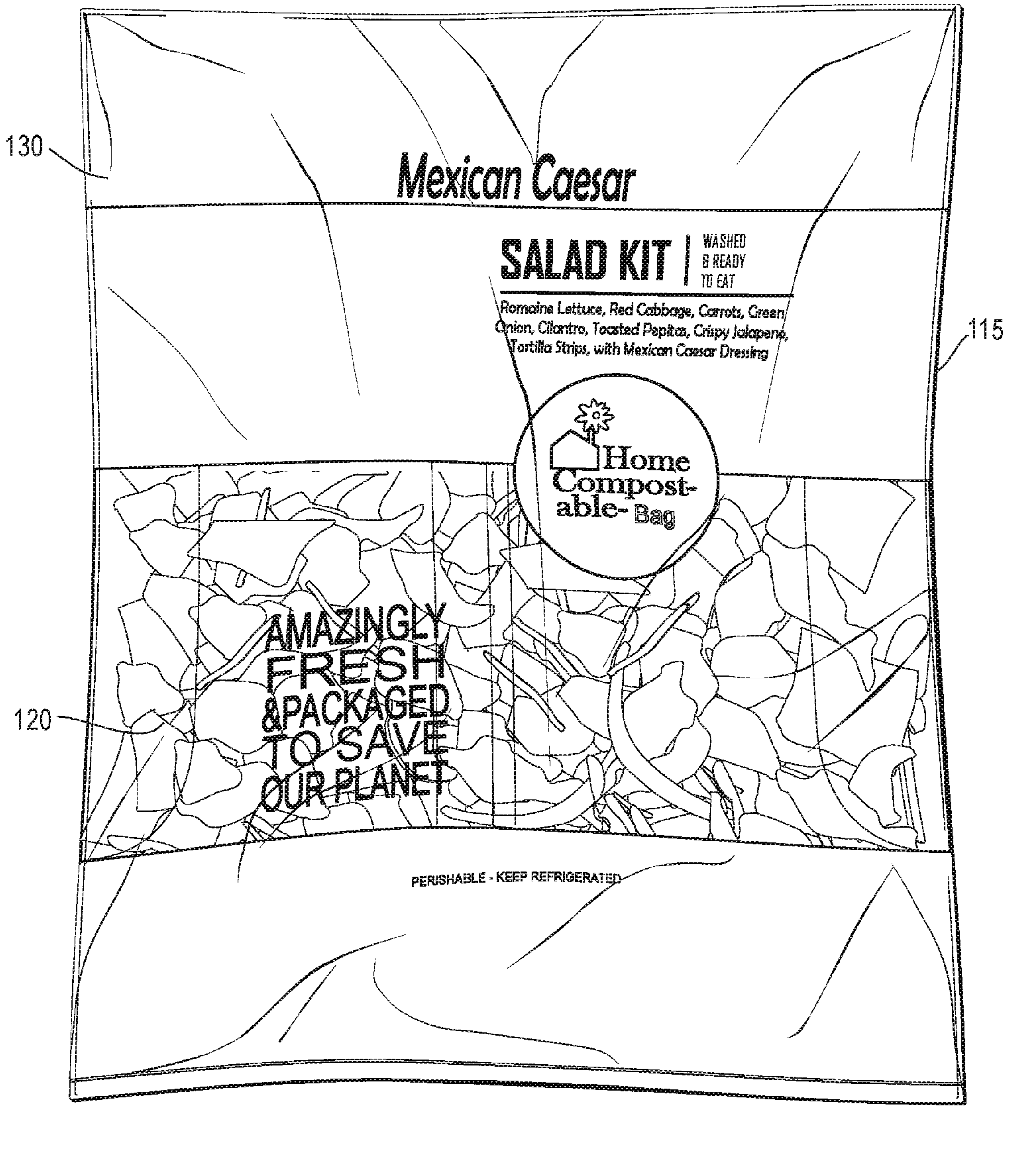
FIG. 5C shows a front view of an embodiment of a package using the configuration of the packaging material of FIGS. 5A-5B.
Figure 5D:
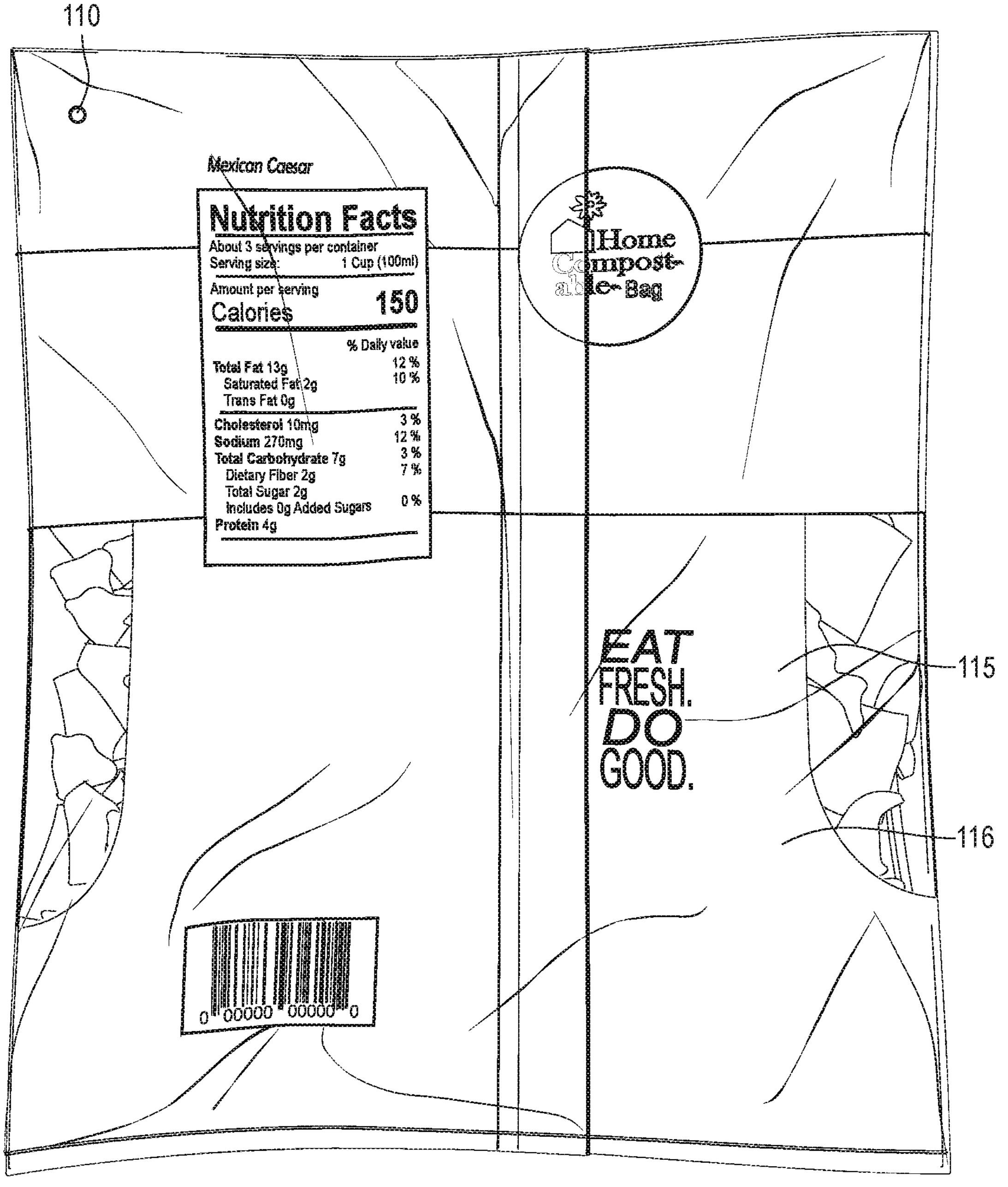
FIG. 5D shows a rear view of the package of FIG. 5C.

As shown in FIG. 5A, the front surface 130 does not have perforations. In contrast, rear surface 140, as shown in FIG. 5B has one or more perforations 110 when the configuration contains a food product. Note that other shapes for the perforations 110 shown in the drawings throughout the present application can be used. Also, the sizes of the perforations 110 shown in the drawings throughout the present application are not to scale. The number of perforations depends on the size of the container 115 including the product and the amount of the product to be contained within the container 115. Note that the combination of the container 115 and the food product contained therein are defined to be a package 116. In the case the product is lettuce, the size of the edges 142, 144, 146, and 148 of the rear surface 140 are 9 inches, 11¼ inches, 11¼ inches, and 9 inches, respectively. In this embodiment, there is a single perforation 110 on the rear surface 140, wherein the perforation 110 is spaced 6¾ inches from the bottom edge 142, 4½ inches from the top edge 148, and 31 inches from the left side edge 146 of the rear surface 140. Such a perforation provides for improved quality of product and storage like as discussed subsequently. An example of a container 115 containing a food product, such as lettuce, is shown in FIGS. 5C-D.

It should be noted that for the embodiment described above, the size and shape of the front surface 130 and the rear surface 140 can be altered without departing from the spirit of the invention. Similarly, the number and position of the perforations can be varied so as to provide sufficient respiration kinetics to provide improved shelf life for the food products within the container 115 and to reduce the likelihood of discoloration of the food products. A discussion of respiration kinetics is provided later in the present description. A way to improve respiration kinetics is to position the perforation(s) so that the food products do not block the perforations and hinder the transfer of gasses through the perforations(s). One other variation should be pointed out as well. In particular, while the described embodiment has a perforation formed in the rear surface 140 of the container 115, sufficient respiration kinetics can be achieved by having the perforation formed on the front surface 130 instead.

Figure 2D:
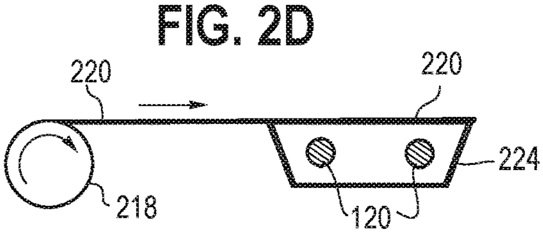
FIG. 2D schematically shows an embodiment of a packaging system that performs an alternative third part of the process of forming a package that contains an item that regards forming a package from the perforated film per the process shown in FIG. 2B and inserting the item within the package according to the present invention.

FIG. 2D schematically shows an alternative package to be formed after the processes described with respect to FIGS. 2A-B are performed. In this scenario, a biodegradable tray 224 has the food products 120 inserted within the tray. Then, a portion of the sheet 220 is placed over the food item and attached to the top edges of the tray in a well-known manner. As an alternative, the sheet 220 is wrapped all the way around the tray in a process known as blow wrapping. The package 116 formed is described in more detail hereafter.

Another way to package a food product 120 located within a tray 224 is shown in FIGS. 6A-F. In particular, a container 115 in the form of a bag similarly described with respect to FIGS. 5A-5D is used to have the tray 224 and food product 120 contained within the interior of the container 115. One difference between the packages of FIGS. 2D and 6A-F, and FIGS. 5A-5D is that the perforations 110 for the packages of FIGS. 2D, 6A, and 6D-F are formed on the front surface 130 that directly faces the food product 120. In addition, the number of perforations may be different based on the size of the container 115 and the product 120 contained in the container 115.

Figure 6A:
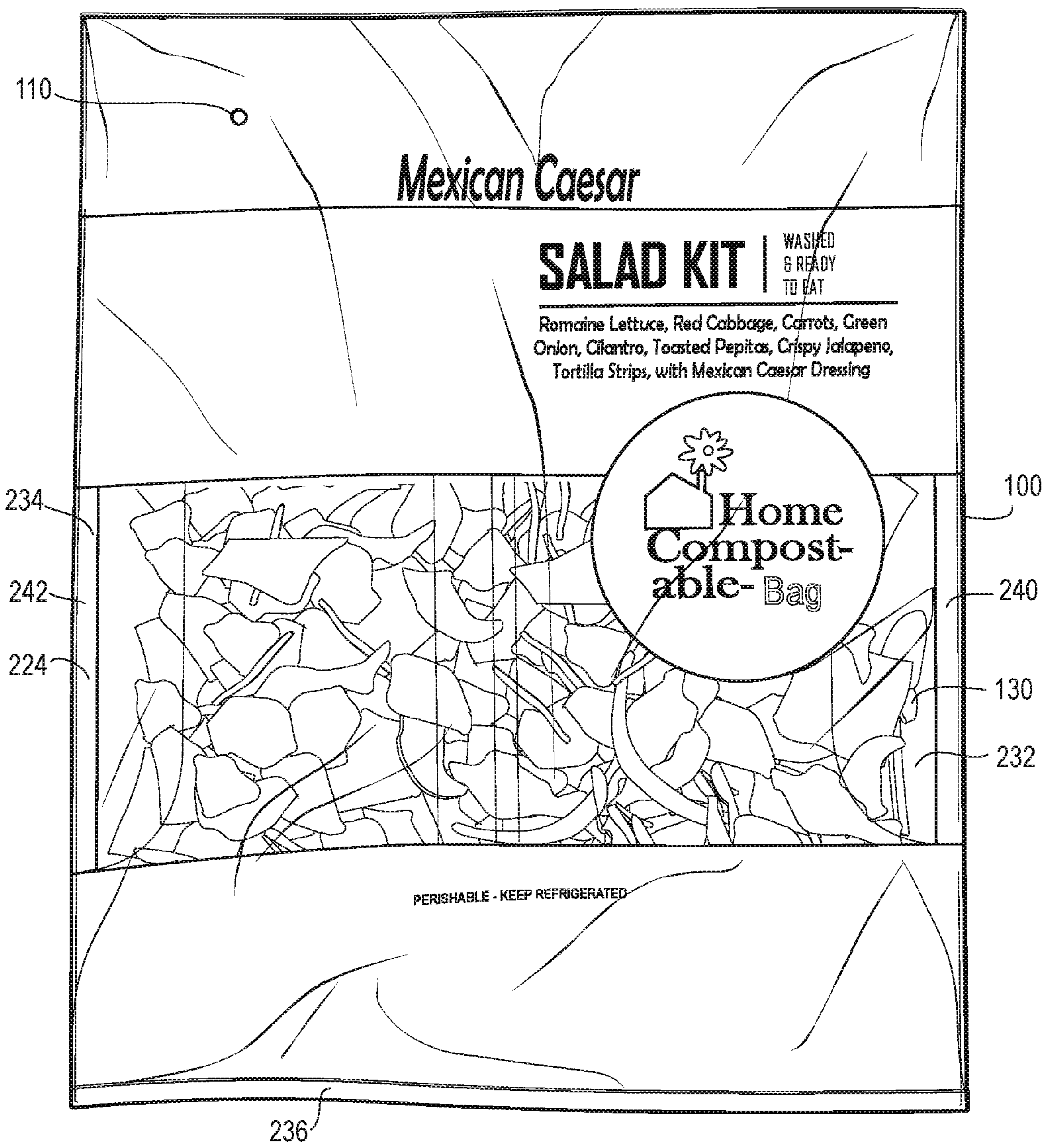
FIG. 6A shows a front view of a second embodiment of a package that employs the packaging material of FIG. 1 according to the present invention.
Figure 6B:
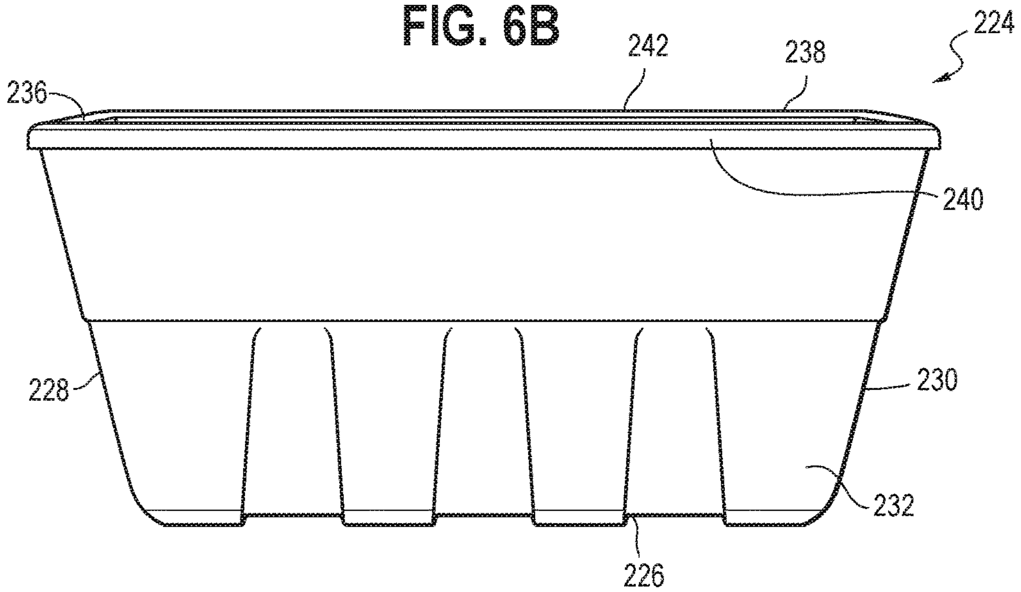
FIG. 6B shows a side view of an embodiment of a tray used with the package of FIG. 6A.
Figure 6C:
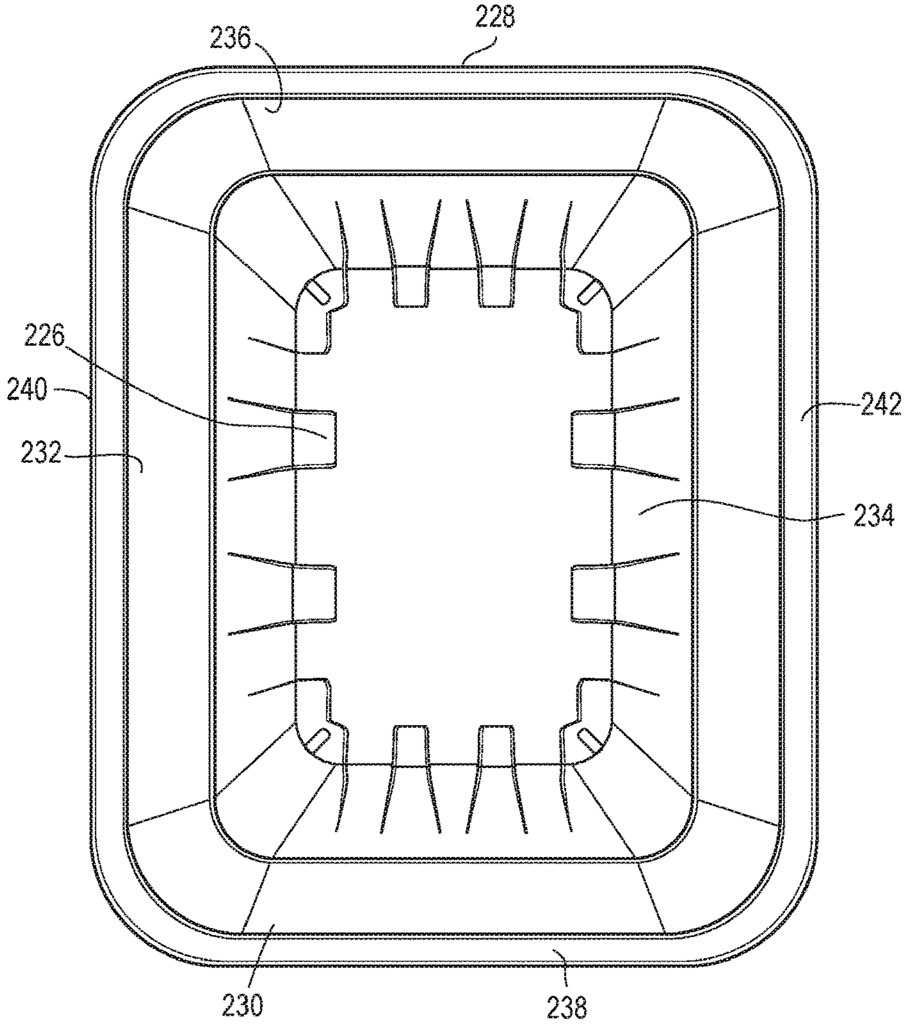
FIG. 6C shows a top view of the tray of FIG. 6B.
Figure 6D:
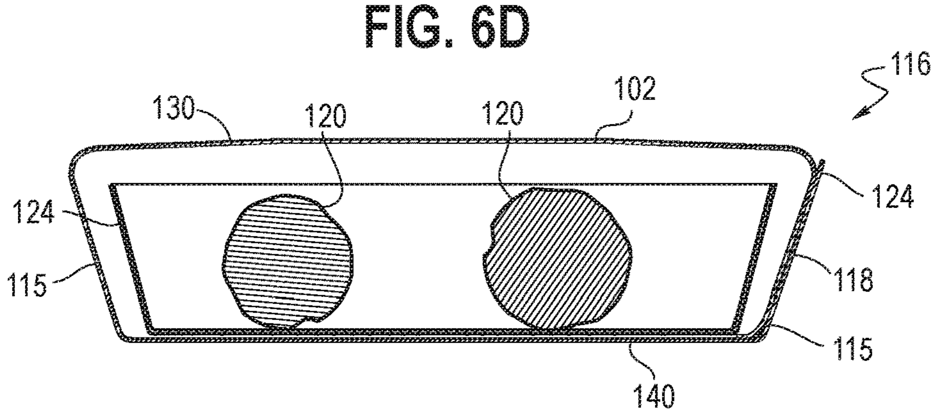
FIG. 6D schematically shows a side cross-sectional view of the package of FIG. 6A.
Figure 6E:
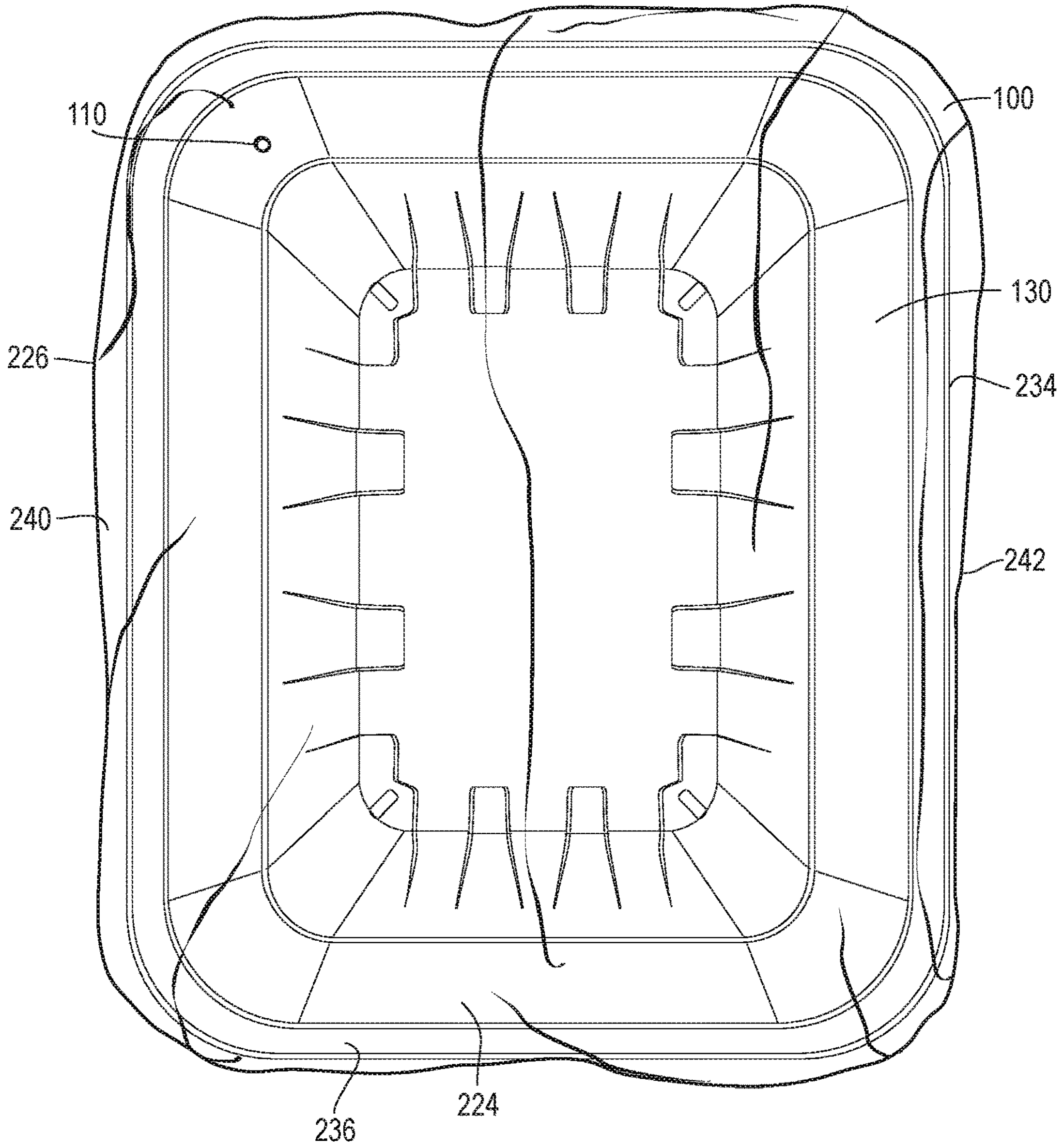
FIG. 6E shows the front view of the package of FIG. 6A when the food product and the graphics have been removed.
Figure 6F:
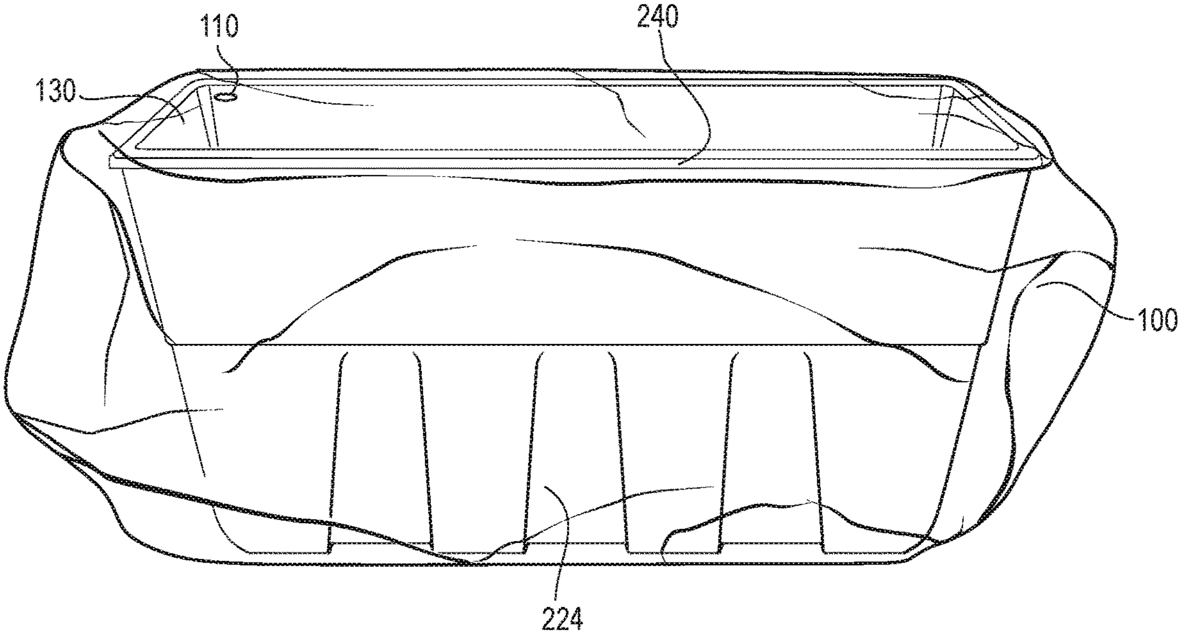
FIG. 6F shows a side view of the package of FIG. 6A when the food product and the graphics have been removed.

Many shapes for the tray 224 are possible without departing from the spirit of the invention. An example of a tray 224 to be inserted in the containers of FIGS. 6A and 6D-F is shown in FIGS. 6B-C, which has a rectangular base 226 having dimensions of 5 inches by 31 inches. Integrally attached to the base are identically sized front and rear walls 228, 230 having a height of 3½ inches as measured to a plane containing the base 226. Similarly, identically sized side walls 232, 234 are integrally attached to the base 226 and front and rear walls 228, 230, wherein the side walls 232, 234 have the same height as the front and rear walls 228, 230. The top rim defined by the walls 228, 230, 232, and 234 defines a rectangular opening having a width of 5¼ inches and a length of 6⅝ inches. The free ends of walls 228, 230, 232, and 234 define rims 236, 238, 240, and 242, respectively. The tray 224 defines a volume of space into which a food product, such as a salad, is inserted. In this example, the front surface 130 of the container 115 can have edges 132, 134, 136, and 138 with dimensions of 6¾ inches, 9¾ inches, 9¾ inches, and 6¾ inches, respectively. In the example of when the food product includes a salad as shown in FIGS. 6A and 6D, there is one aperture 110 (circle not to scale) formed on the front surface 130 that is positioned 2 inches from the rim 236 of the front wall 228 of the tray 224 and is positioned 2 inches from the rim 242 of the side wall 234 of the tray 224. As with the container 115 described with respect to FIGS. 5A-5D, the perforation(s) of the container 115 containing the tray 224 are positioned so as not to be blocked by the food product within the container 115 and positioned on the tray 224. Furthermore, the number and position of the perforations can be varied so as to provide sufficient respiration kinetics to provide improved shelf life for the food products within the container 115 and to reduce the likelihood of discoloration of the food products.

When the three layers 104, 106, 108 are laminated together to form film 102, the film 102 as a whole exhibits a number of properties, such as having high barrier properties, which include forming an excellent barrier to moisture, gases, and aromas. The film 102 provides improved stiffness when stored in refrigerated cabinets and a controlled level of moisture permeability. The film 102 is also resistant to oils and grease. Other properties of film 102 are given in the following table:

| Properties | Testing Condition | Value |
|---|---|---|
| Grammage | | 55.63 g/m$^2$ |
| Yield | | 17.98 m$^2$/kg |
| Seal Strength | | >12N/25 mm MD@100° C. |
| Sealing Temperature Range | | 80-120° C. 1 sec |
| Water Vapor Permeability | 38° C.-90% R.H. | 20 g/m$^2$ 24 hrs |
| Oxygen Permeability | 38° C.-90% R.H. | 20 g/m$^2$ 24 hrs |

In order to increase the shelf life of products contained at least in part by the film 102, apertures 110 are formed in the film 102. To determine the distribution and sizes of apertures to be formed, it is helpful to know the level of respiration of the produce to be contained at least in part by the film 102. UC Davis post-harvest work in MAP produce has uncovered that most produce items have a predictable level of respiration, which needs to be considered for proper packaging and to increase shelf life and control breakdown or rot of the produce. There are at least four different factors that play into how to control the breakdown or rot of produce in a package, such factors are given below:

- Temperature control—controlling the temperature of the produce from harvest to cooling, to processing, to washing, to packing.
- Growing area—meaning lettuce will react differently (slightly) during longer days or shorter days. In some cases, lettuce that grows slower has more resilience to processing and bagging.
- Weather—weather plays a huge role in helping plants grow successfully to a usable crop for processing. For example, too much heat, rain, wind and chill will predict many attributes of a lettuce product to be used in a salad.
- Harvest—there are many key points around the harvesting of the produce that control breakdown or rot. For example:
  - Time of day—many crops in the desert of Yuma must be harvested in hours before the heat of the day hits. While harvesting can be at almost any time of the day, cut vegetables need to be taken in a plastic bin or tote or even a carton back to a cooler where it can be cooled to the appropriate temps for storage, loading, shipping and eventually distributed to food service or retailers.
  - Type of harvest—spring mix and other automated crops are subject to lots of dehydration issues, which can cause the harvested lettuce to fail before they can be cooled. In other cases, lettuce has to be shipped up to 60 miles from the harvest location to a processing plant to be made into salads.

Apertures can be formed by a number of processes that can maximize control of the size and location of the apertures. Such processes include:

a. Laser Perforation—a very exacting process and driven by a computer to fire a laser on to the film at a rate that guarantees that the film has the right amount of holes and the right size and that the holes are completely through the film. This process is built to certain sizes of holes—50 microns to a maximum of 150 microns. This process has been in use since the early 1990's. In this process, the film has been made of a plastic that was not biodegradable.

b. Hot Needle Perforation—This process has the film again run over rollers, which have a specific distribution of needles positioned thereon, wherein the needles are heated to allow the film to be punctured and will not allow the newly punctured holes to "heal" or cover over as the film is continuously rolled. This process is for larger holes, which usually run in a pattern on the bottom or sides of the bag or film as it is formed on a vertical form fill and seal sealing equipment. This process is for very high respiring products, such as large bags of brassicas, spinach, kales.

c. Slitting Film—In this process, the film is run over sets of very sharp blades to slit smaller "lines" or controlled tearing/cutting of the film to form a gap. One of the issues with this process is there is no way to have a high degree of control of the cuts. While the location of the cuts can be controlled, there is no assurance that the cuts will remain open during shipment of the produce products. This means that the packages may or may not receive too much cooling or transference of $O_2$, which usually means that the products packed in slit film packaging must have a hard shell or be very slow to dehydrate when in direct contact with cold, fast moving air. Most tubers can use slits in their packaging film, since they do not dehydrate quickly—having come directly out of the ground.

Figure 3A:
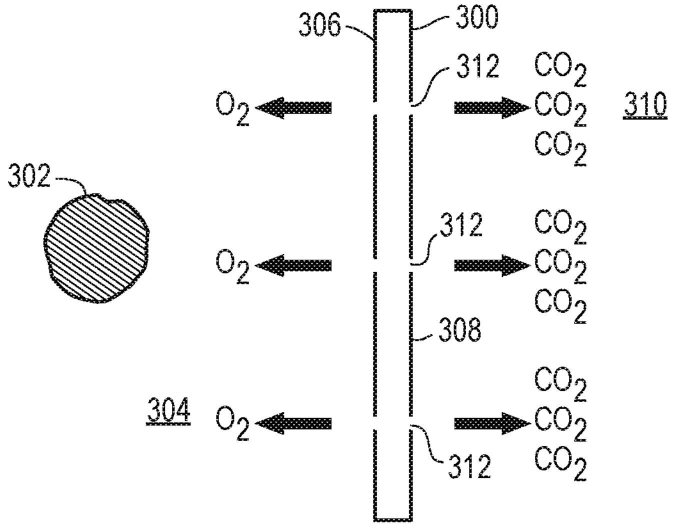
FIG. 3A schematically shows the respiration process of produce with a known package with micro perforations.
Figure 3B:
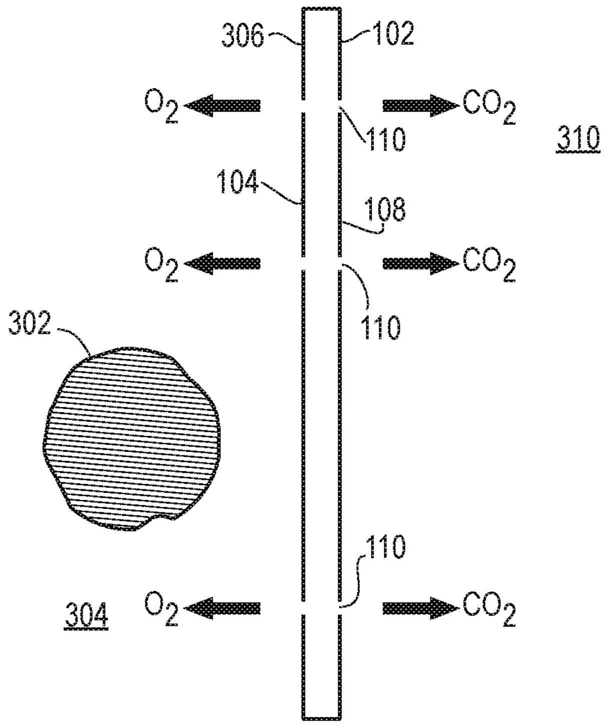
FIG. 3B schematically shows the respiration process of produce with a package with micro perforations in accordance with the present invention.

To understand how the present invention is an improvement over the laser perforation packages of the past, revisiting the environment of such a package is beneficial. FIG. 3A schematically shows a perforated sheet/film of material 300 that is used to package produce 302 that is within the interior 304 of the package. One interior surface 306 of the material 300 faces the interior 304 of the package while an oppositely facing exterior surface 308 of the material 300 faces the exterior atmosphere 310. The material 300 has micro apertures 312 and is made of a non-biodegradable plastic as described previously.

It has been found that controlling the respiration rate of the produce can lead to increased shelf life. For such increased shelf life, it is desired to have increased levels of $CO_2$ and decreased levels of $O_2$ within the interior 304 of the package. However, if the level of $O_2$ becomes too low then unwanted tastes and odors can result. If the level of $CO_2$ becomes too high, then some produce may be damaged. Accordingly, it is desired to control the respiration rate of the produce so that the ideal mixture of $O_2$ and $CO_2$ can be maintained within the package. This has been attempted in the past by cooling the produce within the package prior to being shipped out to a temperature of approximately 36° F. in order to induce the produce 302 to be in a "sleep" state. For certain produce, such as lettuce, nitrogen is introduced into the interior in order to delay discoloration of the produce, such as delaying pinking of lettuce. While in the sleep state, the produce is taking in $O_2$ and producing $CO_2$. $O_2$ enters into the package and $CO_2$ leaves the package via the micro apertures 312. By having the produce in the sleep state, its respiration rate can be controlled to such an extent that the amount of $O_2$ and $CO_2$ within the package is such as to lead to improved shelf life for the produce.

When the package is shipped, the temperature within the package increases over time. Such an increase in temperature results in the produce waking up and generating more $CO_2$ which goes beyond the desired amount of $CO_2$ to increase shelf life. So, it is desired to allow some of the excess $CO_2$ to leave via the micro apertures 312. However, it is not desired that too much $CO_2$ leaves the package. With that said, prior packages that used nonbiodegradable plastic with micro apertures 312 allowed three $CO_2$ to leave the package for every one $O_2$ that enters the package. Such a 3 to 1 ratio is too large for controlling the respiration rate to optimize shelf life.

The present invention has found a way to fine tune the use of a biodegradable film with micro apertures 110 so as to achieve a 1 to 1 ratio of $CO_2$ leaving the package and $O_2$ entering the package (see FIG. 3B), which leads to improved shelf life for the produce. The biodegradable film without apertures leads to improved shelf-like since it provides an improved balance between transmission and retention of gases and moisture within the package. When apertures 110 are formed in the film, further improvement in shelf life is achieved. The apertures 110 extend through the total thickness of the film 102 so that oxygen and water vapor can flow through the film 102 from the exposed side of film 104 to the exposed side of film 108. As mentioned previously, the apertures 110 can also be formed through only one of the films 104, 106, and 108. In addition, labels as described previously can be used to fine tune respiration for films 102 that have apertures that extend through all of the films 104, 106, and 108 or just one of the films 104, 106, and 108. With the above said, parameters of the apertures 110 are adjusted depending on the product to be contained in the film 102 so that the apertures contribute to the film 102 controlling oxygen permeability and water vapor permeability in the space containing the product. Such control, leads to the expulsion of $CO_2$ within the space containing the product and so leads to increased shelf life of the product. In the case of the product being a food product, such control of oxygen permeability and water vapor permeability will result in the food product having increased shelf life when contained by the film 102.

Among the parameters for the apertures that contribute to the control of oxygen permeability and water vapor permeability are: 1) size of each aperture 110, such as diameter of aperture when the aperture is in the shape of a circular hole; 2) the number of apertures 110 per package; and 3) the pattern of the apertures 110 placed on the exterior surfaces of the film 102. In the case of a circular shape for each aperture 110, the diameter can vary from 50 μm to 150 μm.

Figure 4A:
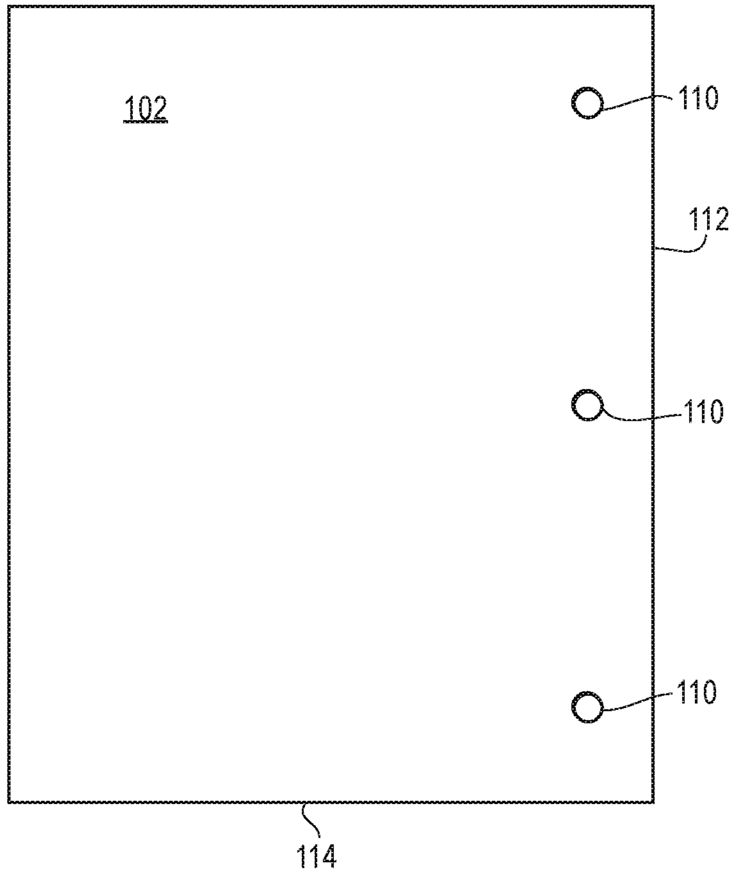
FIG. 4A schematically shows a top view of the packaging material of FIG. 1 when a first embodiment of an aperture pattern is employed according to the present invention.
Figure 4B:
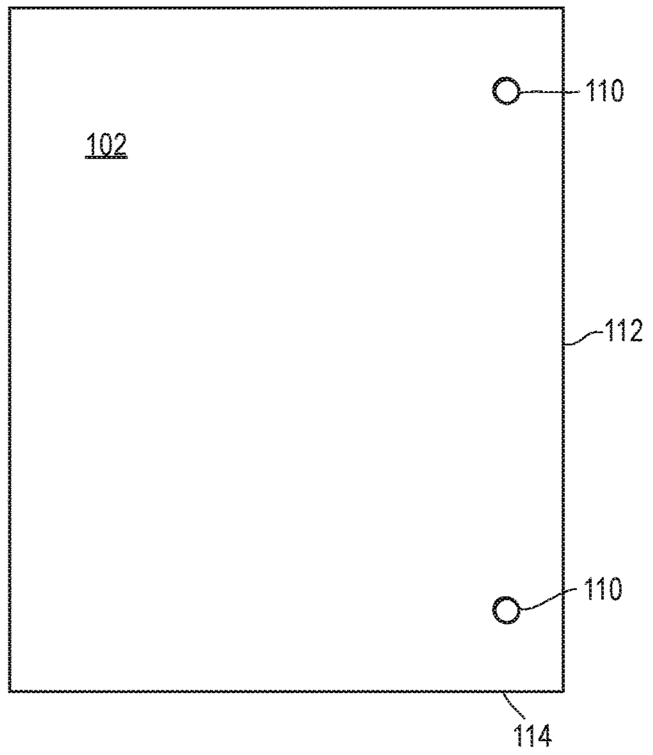
FIG. 4B schematically shows a top view of the packaging material of FIG. 1 when a second embodiment of an aperture pattern is employed according to the present invention.
Figure 4C:
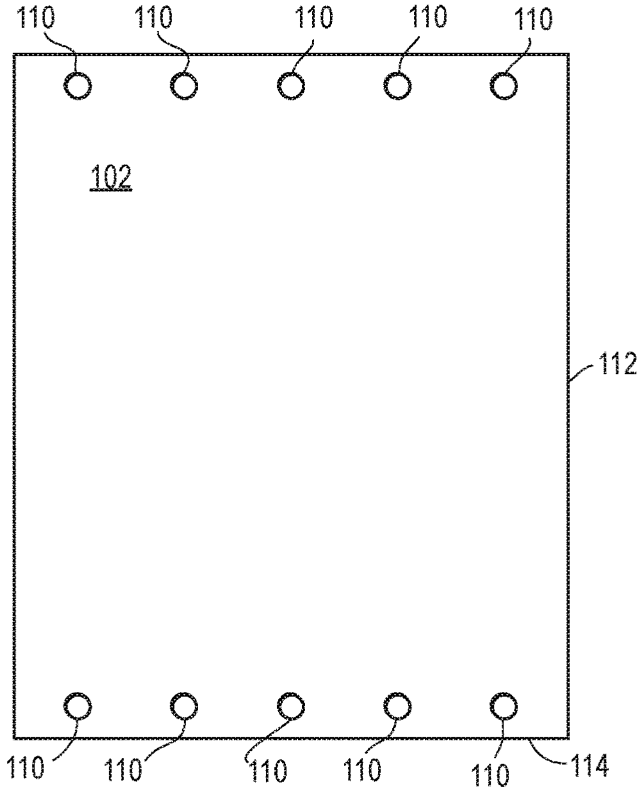
FIG. 4C schematically shows a top view of the packaging material of FIG. 1 when a third embodiment of an aperture pattern is employed according to the present invention.

Examples of aperture parameters that can be used for certain food products are given in the table below:

| Food product and package-type | Shape and size of an Aperture | Number of Apertures per package | Pattern of Apertures | Shelf Life | Amount of Improved Shelf Life when Compared with non-biodegradable plastic with an identical number of micro apertures |
|---|---|---|---|---|---|
| Lettuce items—lettuce alone or in combination with other vegetables contained in bag | Circular—50 μm-100 μm | 1-3 | Linear and parallel to side edge of film (aperture every 2.5-3.5")—FIG. 4A | 14 days | 1-2 days |
| Cabbage items contained in a bag | Circular—50 μm-100 μm every ½"—FIG. 4B | 1-2 | Linear parallel to side edge of film (aperture | 16 days | 2 days |
| Spinach contained in a bag | Circular—150 μm-200 μm | 30-50 | Two linear rows, one parallel to bottom edge and other parallel to top edge (aperture every ¾")—FIG. 4C (15-25 apertures for one of the | 15 days | 1 day |

-continued

| Food product and package-type | Shape and size of an Aperture | Number of Apertures per package | Pattern of Apertures | Shelf Life | Amount of Improved Shelf Life when Compared with non-biodegradable plastic with an identical number of micro apertures |
|---|---|---|---|---|---|
| | | | linear rows and an identical 15-25 apertures for the other linear row) | | |
| Lettuce alone or in combination with vegetables on a tray that is sealed by a film | Circular—50 μm-100 μm | 1-3 | Linear parallel to side edge of film— | 15 | 1-3 |
| Cabbage on a tray that is sealed by a film | Circular—50 μm-100 μm | 2-5 | Linear parallel to side edge of film— | 18-21 | 4-9 |
| Spinach on a tray that is sealed by a film | Circular—150 μm-200 μm | 20-30 | Linear parallel to side edge of film— | 16-18 | 4-6 |

Note that the shelf life data in the table is measured from the time a fresh food product is initially placed in a container made of the film 102 to the time the food product becomes stale while in the container made of the film 102.

FIG. 4A schematically shows a possible pattern to be used when the food product associated with the package is lettuce items, such as lettuce alone or lettuce in combination with vegetables. As shown, the pattern regards 1-3 apertures in the shape of circular holes 110 of equal size that are aligned parallel with a side edge 112 of the film 102. For the examples of FIGS. 4A-C, the number of apertures formed in the film 102 is determined by the amount of food product within the package, the levels of $O_2$ and $CO_2$ transferred into and out of the package, and the level of backflush of $N_2$. In the case of romaine and iceberg lettuce blends, the interior of the package is back flushed with nitrogen so that the atmosphere within the package is down to 2% oxygen and has at least 96% nitrogen to allow for maximum "non-pinking" of the two lettuce ingredients. Cilantro, green onion along with various cabbage shreds can be introduced with the two lettuce ingredients. In this situation, cilantro and green onions have radically higher respiration than lettuces and need more transfer of $CO_2$ than many produce items. The number of holes, size of holes, and patterns of holes need to be chosen to maximize the appearance of the blend present in the package.

FIG. 4B schematically shows a possible pattern to be used when the food product associated with the package is cabbage items. As shown, the pattern regards one to two apertures in the shape of circular holes 110 of equal size that are aligned parallel with a side edge 112 of the film 102.

FIG. 4C schematically shows a possible pattern to be used when the food product associated with the package is Spinach. As shown, the pattern regards ten to twenty apertures in the shape of circular holes 110 of equal size that are formed in two rows of five to ten holes 110 that are aligned parallel with each other, a top edge 113, and a bottom edge 114 of the film 102. As shown, the pattern can also be described as five rows of two holes 110 that are aligned parallel with each other and the side edge 112.

With the apertured film 102 formed as previously described with respect to FIGS. 5A-D, the apertured film 102 is manufactured to be part of a package. As shown in FIGS. 6A-D, the package 116 includes a tray 224 that defines an interior into which one or more food products 120 are inserted. Examples of food products that can be inserted in the tray 224 and be part of the package 116 are: vegetables, fruits, meat, and seafood. The film 102 envelopes the entirety of the tray 224 so that the food products 120 are present within a space defined by the interior of the tray 224 and the top portion 130 of the film 102. As shown in FIG. 6B, the tray 224 has four identical angled walls 228, 230, 232, and 234 that are integrally attached to one another and a rectangular base 226 upon which the food products are supported. It is envisioned that the tray 224 will support 6.5-7.5 ounces of produce. The tray 224 is made of a biodegradable and compostable material, such as porous wood. The use of porous wood provides the advantage of absorbing excess moisture within the package. An example of a tray 224 that can be used is the tray made under the tradename of EC350 manufactured by CKE in Toronto and Nova Scotia in Canada. Other shapes for the tray 118 are possible without departing from the spirit of the invention.

To arrive at the packages 116 of FIGS. 6A-F, the food products 120 are placed on the top surface of the base of the tray 224 and within the interior of the tray 224. Next, the tray 224 and the food products 120 are inserted into the bag configuration described previously with respect to FIGS.

2A-2C and 5A-D and then sealed into the package 116. Later, the packages 116 are separated from one another and shipped for use by consumers.

It will be appreciated by those skilled in the art that changes could be made to the embodiments described above without departing from the broad inventive concept thereof. For example, the package could include non-food items. It is understood, therefore, that this invention is not limited to the particular embodiments disclosed, but it is intended to cover modifications within the spirit and scope of the present invention as defined by the appended claims.

I claim:

1. A package comprising:

a food product selected from the group consisting of lettuce, cabbage, and spinach, wherein the food product was fresh at an instance of time; and a film that is compostable, wherein at least one aperture is formed in the film;

wherein the film defines at least part of a space in which the food product is contained at the instance of time, wherein the film controls oxygen permeability and water vapor permeability to such an extent that when the food product is part of the package at the instance of time, the food product will remain fresh within the package for at least one additional day as measured from the instance of time when compared with the case that the film of the package is replaced by a plastic that is not compostable and the food is part of the package with the plastic at the instance of time;

wherein an atmosphere within the space comprises at least 96% $N_2$.

2. The package of claim 1, wherein the film controls the amount of $CO_2$ flow from the space and through the at least one aperture in a first direction to be approximately equal to the amount of $O_2$ flowing through the at least one aperture in a second direction opposite to the first direction and into the space.

3. The package of claim 1, wherein the at least one aperture extends entirely through the film.

4. A package comprising:

a food product selected from the group consisting of lettuce, cabbage, and spinach, wherein the food product was fresh at an instance of time; and a film that is compostable, wherein at least one aperture is formed in the film;

wherein the film defines at least part of a space in which the food product is contained at the instance of time, wherein the film controls oxygen permeability and water vapor permeability to such an extent that when the food product is part of the package at the instance of time, the food product will remain fresh within the package for at least one additional day as measured from the instance of time when compared with the case that the film of the package is replaced by a plastic that is not compostable and the food product is part of the package with the plastic at the instance of time; and wherein the film controls the amount of $CO_2$ flow from the space and through the at least one aperture in a first direction to be approximately equal to the amount of $O_2$ flowing through the at least one aperture in a second direction opposite to the first direction and into the space.

5. The package of claim 4, wherein the at least one aperture extends entirely through the film.

6. A package comprising:

a food product selected from the group consisting of lettuce, cabbage, and spinach, wherein the food product was fresh at an instance of time; and a film that is compostable, wherein at least one aperture is formed in the film;

wherein the film defines at least part of a space in which the food product is contained at the instance of time, wherein the film controls oxygen permeability and water vapor permeability to such an extent that when the food product is part of the package at the instance of time, the food product will remain fresh within the package for at least one additional day as measured from the instance of time when compared with the case that the film of the package is replaced by a plastic that is not compostable and the food product is part of the package with the plastic at the instance of time; and wherein the film comprises:

a first film that controls the oxygen permeability; and a second film that controls the water vapor permeability, wherein the first film is laminated to the second film via an adhesive that is located between the first film and the second film and adheres the first film to the second film.

7. The package of claim 6, wherein the first film comprises a biofoil, the adhesive comprises a complex starch, and the second film comprises cellulose.

8. The package of claim 6, wherein the at least one aperture extends entirely through the film.

9. The package of claim 6, wherein each of the at least one aperture has a diameter that ranges from 50 μm to 150 μm.

10. The package of claim 6, wherein the second film has a thickness that ranges from 19μ to 20μ.

11. The package of claim 6, wherein the adhesive has a thickness of approximately 3μ.

12. The package of claim 6, wherein the second film comprises cellulose based on renewable resources.

13. The package of claim 6, wherein the first film is transparent, the second film is transparent, and wherein the adhesive allows for the film to be transparent.

14. The package of claim 13, wherein the first film comprises a biofoil, the adhesive comprises a complex starch, and the second film comprises cellulose.

15. The package of claim 6, further comprising a tray upon which the food product is supported and which the film contacts, wherein the tray and the film define in part the space.

16. The package of claim 15, wherein an atmosphere within the space comprises at least 96% $N_2$.

17. The package of claim 15, wherein the film controls the amount of $CO_2$ flow from the space and through the at least one aperture in a first direction to be approximately equal to the amount of $O_2$ flowing through the at least one aperture in a second direction opposite to the first direction and into the space.

18. The package of claim 15, wherein the tray is compostable.

19. The package of claim 18, wherein when the food product is selected from the group consisting of lettuce, cabbage and spinach, the food product will remain fresh within the package for an additional one to nine days as measured from the instance of time when compared with the case that the film of the package is replaced by that plastic that is not compostable and the food product is part of the package with the plastic at the instance of time.

20. The package of claim 18, wherein the film controls the amount of $CO_2$ flow from the space and through the at least one aperture in a first direction to be approximately equal to the amount of $O_2$ flowing through the at least one aperture in a second direction opposite to the first direction and into the space.

21. A package comprising:

a food product that was fresh at an instance of time; and a transparent film that is compostable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability; and wherein when the food product is selected from the group consisting of lettuce, cabbage, and spinach, the food product contained within the transparent film at the instance of time will remain fresh within the package for an additional one to two days as measured from the instance of time when compared with the case that the transparent film of the package is replaced by a plastic that is not biodegradable and compostable and the food product is part of the package with the plastic at the instance of time.

22. The package of claim 21, wherein the at least one aperture extends entirely through the transparent film.

23. The package of claim 21, wherein the first film comprises a biofoil, the adhesive comprises a complex starch, and the second film comprises cellulose.

24. The package of claim 23, wherein the first film is transparent, the second film is transparent, and wherein the adhesive allows for the film to be transparent.

25. A package comprising:

a food product selected from the group consisting of lettuce, cabbage, and spinach, wherein the food product was fresh at an instance of time; and a transparent film that is compostable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability; and wherein an atmosphere within a space defined by the transparent film and containing the food product comprises at least 96% $N_2$;

wherein when the food product is part of the package at the instance of time, the food product will remain fresh within the package for at least one additional day as measured from the instance of time when compared with the case that the transparent film of the package is replaced by a plastic that is not compostable and the food product is part of the package with the plastic at the instance of time.

26. The package of claim 25, wherein the at least one aperture extends entirely through the transparent film.

27. The package of claim 25, wherein each of the at least one aperture has a diameter that ranges from 50 μm to 100 μm.

28. The package of claim 25, wherein the first film has a thickness that ranges from 19μ to 20μ.

29. The package of claim 25, wherein the transparent film is cured at a temperature that ranges from 36° F. to 65° F. for more than 48 hours, and wherein after curing the transparent film is transparent.

30. The package of claim 25, wherein the at least one aperture comprises at most three apertures formed in the transparent film.

31. The package of claim 25, wherein the at least one aperture comprises a plurality of apertures formed in a pattern of two straight lines that are parallel to one another.

32. The package of claim 25, wherein the first film comprises a biofoil, the adhesive comprises a complex starch, and the second film comprises cellulose.

33. The package of claim 32, wherein the first film is transparent, the second film is transparent, and wherein the adhesive allows for the film to be transparent.

34. A package comprising:

a food product selected from the group consisting of lettuce, cabbage, and spinach, wherein the food product was fresh at an instance of time; and a transparent film that is compostable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability; and wherein the transparent film controls the amount of $CO_2$ flow from a space, defined by the transparent film and containing the food product, and through the at least one aperture in a first direction to be approximately equal to the amount of $O_2$ flowing through the at least one aperture in a second direction opposite to the first direction and into the space.

35. The package of claim 34, wherein the first film comprises a biofoil, the adhesive comprises a complex starch, and the second film comprises cellulose.

36. The package of claim 34, wherein the at least one aperture extends entirely through the transparent film.

37. The package of claim 34, wherein the first film is transparent, the second film is transparent, and wherein the adhesive allows for the film to be transparent.

38. The package of claim 37, wherein the first film comprises a biofoil, the adhesive comprises a complex starch, and the second film comprises cellulose.

39. A package comprising:

a food product that was fresh at an instance of time; and a transparent film that is compostable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability; and wherein the food product is selected from the group consisting of cabbage and spinach and wherein each of the at least one aperture has a diameter of from 50 μm to 200 μm, wherein the at least one aperture comprises a plurality of apertures formed in a pattern comprising a straight line, and the food product that is part of the package will remain fresh within the package for up to two additional days as measured from the instance of time when compared with the case that the transparent film of the package is replaced by a plastic that is not biodegradable and compostable and the food product is part of the package with the plastic at the instance of time.

40. The package of claim 39, wherein the at least one aperture extends entirely through the transparent film.

41. The package of claim 39, wherein the first film comprises a biofoil, the adhesive comprises a complex starch, and the second film comprises cellulose.

42. The package of claim 41, wherein the first film is transparent, the second film is transparent, and wherein the adhesive allows for the film to be transparent.

43. A package comprising:

a food product selected from the group consisting of lettuce, cabbage, and spinach, wherein the food product was fresh at an instance of time; and a transparent film that is compostable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability;

a tray upon which the food product is supported and which the transparent film contacts, wherein the tray and the transparent film define in part a space in which the food product that was fresh at the instance of time is contained.

44. The package of claim 43, wherein the at least one aperture extends entirely through the transparent film.

45. The package of claim 43, wherein the tray is made of porous wood that absorbs excess moisture within the package.

46. The package of claim 43, wherein the tray is compostable.

47. The package of claim 46, wherein when the food product is selected from the group consisting of lettuce, cabbage and spinach, the food product will remain fresh within the package for an additional one to nine days as measured from the instance of time when compared with the case that the transparent film of the package is replaced by a plastic that is not biodegradable and compostable and the food product is part of the package with the plastic at the instance of time.

48. The package of claim 46, wherein the transparent film controls the amount of $CO_2$ flow from the space and through the transparent film in a first direction to be approximately equal to the amount of $O_2$ flowing through the transparent film in a second direction opposite to the first direction and into the space.

49. The package of claim 43, wherein the first film comprises a biofoil, the adhesive comprises a complex starch, and the second film comprises cellulose.

50. The package of claim 49, wherein the first film is transparent, the second film is transparent, and wherein the adhesive allows for the film to be transparent.

51. A package comprising:

a food product selected from the group consisting of lettuce, cabbage, and spinach, wherein the food product was fresh at an instance of time; and a film that is biodegradable, wherein at least one aperture is formed in the film;

wherein the film defines at least part of a space in which the food product is contained at the instance of time, wherein the film controls oxygen permeability and water vapor permeability to such an extent that when the food product is part of the package at the instance of time, the food product will remain fresh within the package for at least one additional day when compared with the case that the film of the package is replaced by a plastic that is not compostable and the food product is part of the package with the plastic at the instance of time;

wherein the film that is biodegradable is also compostable.

52. The package of claim 51, wherein the at least one aperture extends entirely through the film.

53. A package comprising:

a food product selected from the group consisting of lettuce, cabbage, and spinach, wherein the food product was fresh at an instance of time; and a transparent film that is biodegradable, wherein the transparent film comprises:

a first film that controls the oxygen permeability;

a second film that controls the water vapor permeability, wherein the first film is laminated to the second film via an adhesive that is located between the first film and the second film and adheres the first film to the second film;

wherein the transparent film controls oxygen permeability and water vapor permeability, wherein at least one aperture is formed in the transparent film and which contributes to the controlling of oxygen permeability and water vapor permeability; and wherein the transparent film controls oxygen permeability and water vapor permeability to such an extent that when the transparent film encompasses the food product so that the food product is part of the package at the instance of time, the food product will remain fresh for at least one additional day as measured from the instance of time when compared with the case that the transparent film of the package is replaced by a plastic that is not biodegradable and compostable and the food product is part of the package with the plastic at the instance of time.

54. The package of claim 53, wherein the transparent film that is biodegradable is also compostable.

55. The package of claim 53, wherein the at least one aperture extends entirely through the transparent film.

* * * * *